UNITED STATES PATENT OFFICE.

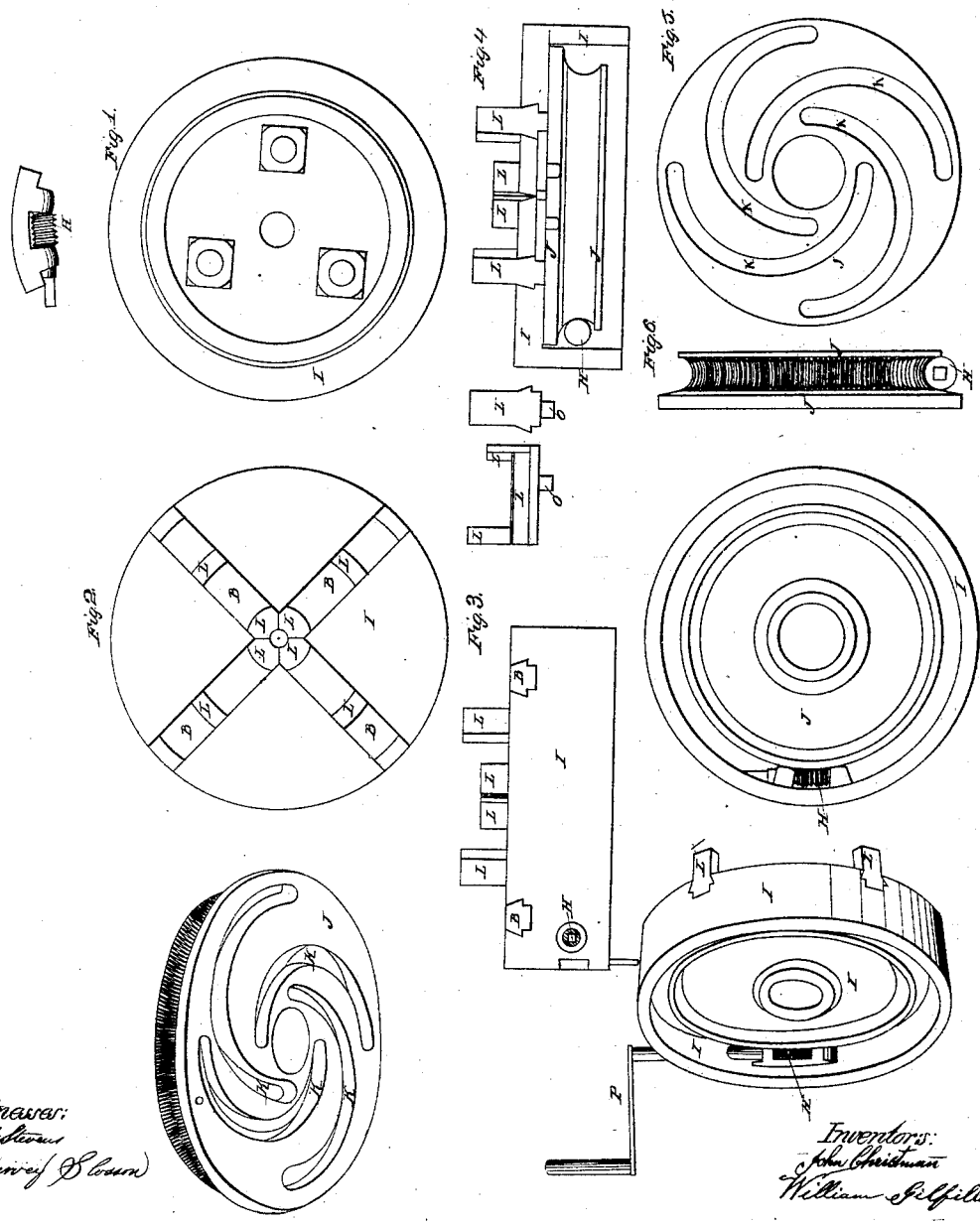

J. CHRISTMAN AND WILLIAM GILFILLAN, OF SYRACUSE, NEW YORK.

IMPROVED CHUCK FOR LATHES.

Specification forming part of Letters Patent No. 38,148, dated April 14, 1863.

*To all whom it may concern:*

Be it known that we, JOHN CHRISTMAN and WILLIAM GILFILLAN, of the city of Syracuse, in the county of Onondaga and State of New York, have invented a new and useful Improvement in Chucks for Lathes; and we do hereby declare the following to be a full, clear, and exact description of the construction and operation of the same, reference being had to the annexed drawings, making part of this specification.

The nature of our invention consists in the construction and arrangement, as hereinafter described, of the several parts of the chuck used in lathes for centering and holding pieces of wood or metal while being turned, whereby we make a very strong and compact device, very convenient of operation, and not liable to get out of order.

In the drawings, Figure 1 represents a back view of the chuck; Fig. 2, a front view; Figs. 3 and 4, edge views. Fig. 5 represents the inner face of the driving-wheel, and Fig. 6 an edge view of the same wheel.

The remaining figures of the drawings represent the different parts of the chuck from different points of view.

The same letters of reference denote the same part wherever they occur.

To enable others skilled in the art to make and use our invention, we will proceed to describe the same with reference to the drawings.

I represents the body of the chuck or outer flanged or casement-wheel or disk of iron of any convenient diameter, which is connected by a center screw or otherwise to the mandrel of the head-block of a lathe. On the front face of the part I are four radial dovetail-grooves, B, from the circumference to the center, equidistant from each other, for the reception of the sliding clamping pins or dogs L, which are also of dovetail form to fit grooves B. Within the casement disk or wheel I the driving wheel or disk J is placed, so that it can revolve independently of the outer wheel. The edge of the wheel or disk J is provided with a spiral screw-thread or spirally-arranged cogs, as shown in Fig. 6. The front face of disk J has cut into it the four grooves K, arranged eccentric to the center of the wheel, and of sufficient depth and width to receive the projections O upon the sliding dogs or pins L.

H is a screw working in lugs attached to the inner face of the flange of the main wheel in such a manner that its square shank may project through an opening in the side of the wheel, as shown in Fig. 3, so that a crank, P, may be attached thereto, by which it may be turned, the screw H resting upon the edge of the inner wheel, J, and the thread upon the one corresponding to that of the other.

The operation is as follows: By turning the crank P, and thereby the screw H, the inner wheel, J, is made to revolve by the action of the screw H upon its screw-thread, around its periphery. The sliding dogs or pins L, working in radial grooves B, and having the projections O resting within the eccentric grooves K of the inner wheel, are forced to and from the center, according to the direction in which the crank is turned.

It is obvious that any object—as a piece of wood or metal—to be turned in a lathe will be centered and firmly held between the clamping-pins L in the manner well known in devices for this object.

Having thus described our invention, what we claim as new, and desire to secure by Letters Patent, is—

A chuck constructed, arranged, and operated as described—that is to say, having the sliding pins or dogs L working in the radial dovetail-grooves in the outer casement-wheel, in combination with projections O, working in the eccentric grooves in the face of the inner wheel or disk, J, when said wheel or disk J is operated by means of the tangential screw H, the several parts being constructed, arranged, and operated in the manner described, for the purpose specified.

JOHN CHRISTMAN.
WILLIAM GILFILLAN.

Attest:
P. LYNCH,
ALFRED WILKINSON.